(12) United States Patent
Nania et al.

(10) Patent No.: US 8,459,729 B1
(45) Date of Patent: Jun. 11, 2013

(54) WIND DEFLECTOR ASSEMBLIES FOR AN OPENING OF A VEHICLE ROOF

(75) Inventors: Adrian Nania, Rochester, MI (US); Michael McBryar, Southfield, MI (US)

(73) Assignee: Webasto Roof Systems Inc., Rochester Hills,, MI (US)

( * ) Notice: Subject to any disclaimer, the term of this patent is extended or adjusted under 35 U.S.C. 154(b) by 0 days.

(21) Appl. No.: 13/422,523

(22) Filed: Mar. 16, 2012

(51) Int. Cl.
*B60J 7/22* (2006.01)

(52) U.S. Cl.
USPC ......................................................... 296/217

(58) Field of Classification Search
USPC ......................................................... 296/217
See application file for complete search history.

(56) References Cited

U.S. PATENT DOCUMENTS

| | | | |
|---|---|---|---|
| 4,081,194 A | | 3/1978 | Jardin |
| 4,492,406 A | * | 1/1985 | Matsubara ..................... 296/217 |
| 4,630,859 A | | 12/1986 | Bienert et al. |
| 4,676,546 A | * | 6/1987 | Igel ............................... 296/217 |
| 5,052,746 A | | 10/1991 | Reihl et al. |
| 5,178,436 A | * | 1/1993 | Eberius et al. ................. 296/217 |
| 5,660,429 A | | 8/1997 | Wienchol |
| 6,164,717 A | * | 12/2000 | Haagen .......................... 296/217 |
| 7,533,928 B2 | * | 5/2009 | Biewer et al. .................. 296/217 |
| 8,246,111 B2 | * | 8/2012 | Kohout et al. ................. 296/217 |
| 8,292,360 B2 | * | 10/2012 | Uehara .......................... 296/217 |
| 2005/0062318 A1 | | 3/2005 | Schoenberger |
| 2007/0278831 A1 | * | 12/2007 | Eller et al. .................... 296/217 |
| 2008/0067839 A1 | * | 3/2008 | Staltmayer .................... 296/217 |

FOREIGN PATENT DOCUMENTS

| | | | |
|---|---|---|---|
| DE | 3833865 A1 | * | 4/1990 |
| DE | 3137191 | * | 3/1998 |
| DE | 10 2004 063 799 | * | 6/2006 |
| JP | 04287714 A | * | 10/1992 |

* cited by examiner

*Primary Examiner* — Dennis Pedder
(74) *Attorney, Agent, or Firm* — Fitch, Even, Tabin & Flannery LLP

(57) ABSTRACT

Wind deflector assemblies for an opening of a vehicle roof having a plurality of pretensioned movable arms. In one approach, a wind deflector assembly for a vehicle having a roof opening, is provided having a wind deflector guide attached to a vehicle along a front edge of the roof opening in a generally transverse axis of the vehicle on its lower edge; the wind deflector guide extendible above the roof opening by attachment on its upper edge to a plurality of movable deflector arms mounted to and extending rearward along a generally longitudinal axis of the vehicle; the plurality of movable deflector arms having an pretensioning element to extend the wind deflector guide from a retracted position to a deployed position. The plurality of movable deflector arms can be two reciprocal assemblies of three deflector arms, each assembly movable on four pivot mounts.

12 Claims, 14 Drawing Sheets

WIND DEFLECTOR ASSEMBLIES FOR AN OPENING OF A VEHICLE ROOF

FIELD OF THE INVENTION

Wind deflector assemblies for an opening of a vehicle roof, and specifically, wind deflector assemblies for an opening of a vehicle roof having a plurality of pretensioned movable arms.

BACKGROUND

Movable surfaces to cover an opening of a vehicle roof, such as sunroofs and moonroofs, are known in the art. The movable surface can be rearwardly displaced in the lengthwise direction of the vehicle to selectively close or expose this opening. Typically, a wind deflector is provided at or near the forward edge of the roof opening to reduce the effects of wind and wind associated noise inside the vehicle passenger compartment when the roof opening is exposed. Wind deflectors can be permanently mounted forward of the roof opening or deployable, such as from a retracted position below the forward edge of a roof opening. In this instance, the wind deflector can be deployed as the movable surface is displaced rearward to an open position.

An example of a deployable wind deflector for the opening of a motor vehicle roof can include a wind deflector guide/profile attached to rearwardly extending arms, which are pivoted on the vehicle body below the roof opening. The deflector guide can be pretensioned, usually by a spring, to deploy by rising and projecting through the vehicle opening near the roof opening front edge when the movable surface is displaced. Accordingly, the entire wind deflector assembly is typically configured to be disposed underneath the movable surface when it is closed. (See e.g., U.S. Pub. 2007/0278831 to Eller et al.)

Despite these advances, further improvements are possible. For example, the wind deflector guides/profiles frequently do not have an optimal rake angle (i.e., an angle of slope measured from horizontal, or from a vertical line 90° perpendicular to horizontal). For example, to increase guide height above a vehicle roof surface a desired or predetermined amount, the rearwardly extending side arms are usually lengthened. This often results in the pivoting deflector arms extending the length of the edge of the roof opening. The resultant arc of the deployed guide is accordingly reduced as is the rake of the guide. The lengthened side arms can also cause side wind noise and provide an unattractive and cluttered appearance. Further, the effort to lower ('knock-down') the side arms to retract the wind deflector guide can cause excess noise and potential stalling and jamming of the mechanism. Durability issues can also arise due to high friction especially during closure.

SUMMARY

Accordingly, one or more of the embodiments presented herein provide wind deflector assemblies for an opening of a vehicle roof having a plurality of pretensioned movable arms.

In one approach, a wind deflector assembly for a vehicle having a roof opening, is provided having a wind deflector guide attached to a vehicle along a front edge of the roof opening in a generally transverse axis of the vehicle on its lower edge; the wind deflector guide extendible above the roof opening by attachment on its upper edge to a plurality of movable deflector arms mounted to and extending rearward along a generally longitudinal axis of the vehicle; the plurality of movable deflector arms having an pretensioning element to extend the wind deflector guide from a retracted position to a deployed position. The plurality of movable deflector arms can be two reciprocal assemblies of three deflector arms, each assembly movable on four pivot mounts.

In one approach, the wind deflector arm assembly can have a first deflector arm pivotally connected at a first end to a second forward deflector arm along its length; the first deflector arm pivotally connected at its second end to a first end of a third rearward deflector arm; the wind deflector guide connected at its upper edge to a first end of the second forward deflector arm; and the second and third deflector arm pivotally mounted to the vehicle at each respective second ends.

In some embodiments the first deflector arm can have an option top edge profile that operates to work in cooperation with a cam on a sliding track car for a movable surface to maintain the extension of the top edge of the wind deflector guide along the travel of the slide track car at a predetermined distance from the movable surface. In one approach the predetermined distance is at lease about 8 mm.

In other embodiments, the wind deflector assembly can further have at least one stop to prevent the second and third deflector arms from pivoting more than 90 degrees.

In many embodiments the pretensioning element is positioned on the first deflector arm in a generally rearward longitudinal axis of the vehicle. The pretensioning element is an extension spring. In one approach, the pretensioning element is disposed within the first deflector arm. In other embodiments, the extension spring can be mounted to the vehicle to be extended about 30 percent greater than its preload length in the deployed position and to be extended about 50 percent greater than its preload length in the extended position. In some embodiments the pretensioning element can have have a reduced force on the wind deflector guide in the retracted position relative to the deployed position that is in the range of about 9 percent to about 60 percent. Also, the force on the wind deflector guide can be in the range of about 22 to about 30 Nm in the deployed position and in the range of about 12 to about 20 Nm in the retracted position.

In other embodiments the pretensioning element can provide a force on the first deflector arm that is greater than the force transferred to the wind deflector guide in the ratio range of about 1:1.09 to 1:1.69 times in the deployed position; and in the ratio range of about 1:2.35 to about 1:5.09 in the retracted position.

Other features will become more apparent to persons having ordinary skill in the art to which the package pertains and from the following description and claims.

BRIEF DESCRIPTION OF THE DRAWINGS

The above and other aspects, features and advantages of the present embodiments will be more apparent from the following more particular description thereof, presented in conjunction with the following figures, wherein.

Corresponding reference characters indicate corresponding components throughout the several views of the drawings.

DETAILED DESCRIPTION

The following description is not to be taken in a limiting sense, but is made merely for the purpose of describing the general principles of exemplary embodiments. The scope of the embodiments should be determined with reference to the claims. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Figure 14:
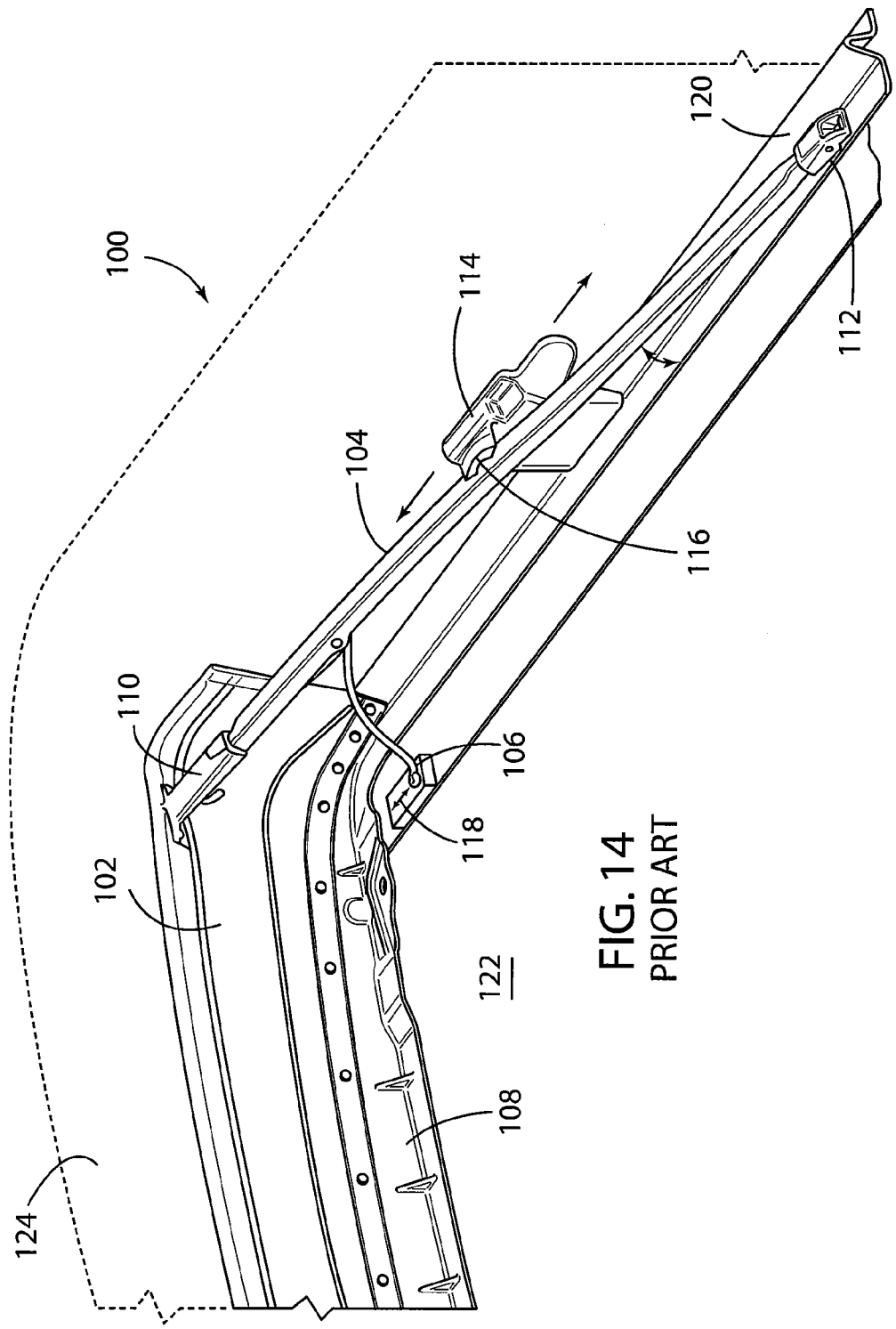
FIG. 14 illustrates a perspective top view of a prior art wind deflector assembly in a deployed position.

FIG. 14 illustrates one known approach in the art to provide a wind deflector assembly disposed beneath movable panel (such as a top-slider sunroof) while in a closed position and deployed as a roof 124 having an opening 122 is exposed. This assembly is generally indicated at 100. As shown, a fabric wind deflector guide 102 is raised by pair of rearwardly extending arms 104. Arms 104 are pivotably mounted to the roof opening frame 108 on a transverse axis to the vehicle at mount 112. It is noted that the right hand assembly is illustrated. For ease of understanding, the left hand support assembly (not shown) is reciprocal to the right hand support arm assembly. Wind deflector guide 102 is mounted to the support arm 104 by a bracket 110. Bracket 110 can be pivotably mounted to the deflector guide 102. Deflector arm 104 is pretensioned to deploy by a pretensioning element (e.g., torsion spring 106).

In the embodiment of FIG. 14, wind deflector guide 102 can be "knocked-down" (i.e., lower or retracted) by a downward force applied to the support arm. Typically, this downward force can be applied by a sliding car in a track, which moves the movable panel assembly as well. For example, this can be accomplished using sliding element (track car) 114 having a fixed cam 116 sliding on a slide track 120, which is attached to the movable surface (not shown).

The pretensioning aspect of the assembly of FIG. 14 is configured as torsion spring 106. The amount of tension force in this approach, though, is limited by the number of turns and size of the turns provided in spring 106 that can be placed within the frame of deflector arm 104. For example in this example, only about three turns of the spring are possible. Further, tensioning springs have positioned as such have an accumulating increased force as the wind deflector guide 102 is knocked-down during closure of the roof opening. This can cause straining or stalling of the drive motor with resultant sound and durability issues. Further, as spring 106 is compressed the bottom of the spring needs to slide forward, such as shown in the pad area designated at 118. This can result in additional mechanism noise and/or issues to maintain grease to slide area 118. As for the deflector arm, a fixed cam sliding knock-down can cause noise, motor stall and durability issues due to high friction and the extreme pivoting angle. Additionally, the deflector arm length progressively limits the rake (e.g., the degree to which the wind deflector guide can be angled rearward) of the wind deflector guide as the deflector arm lengthens. The long support arm can cause side wind noise and a less than optimal appearance.

Generally, the present embodiments address the challenges in the art to improve the quality, cost, efficiency and operation of wind deflector assemblies for openings of vehicle roofs. Operational parameters can include limiting packaging size, power requirements, wind performance, appearance, desired guide rake and height above a roof surface, durability, sound performance and the like. Accordingly, the assemblies provided in the present embodiments improve the operation of a wind deflector assembly along these parameters using a plurality of pretensioned pivoting arms. In one approach, pivotably mounted deflector arms are pretensioned by an extension spring positioned transverse to the axis of the wind deflector guide. An articulated deflector arm arrangement is situated on each rearwardly extending arm of the wind deflector guide, the spring tension acting on these deflector arms. As described below, it is noted that the pretensioning element could be configured for placement at nearly every position at every arm.

The present embodiments allow for improved height and rake of a deployed (extendable) wind deflector guide through the use of multiple pivoting arms. Further, the flexibility of the wind deflector guide allows for direct attachment to the vehicle, such as a frame of the roof opening. The deflector arm mechanism has no sliding parts, but rather have pivoting joints (including bushed pivoting joints), which provide improved durability and require no greasing or other maintenance. The wind deflector can be knocked-down by a cam (including a roller cam) mounted to a sliding element (track car) for the sunroof. With a roller cam, frictional drag and noise are reduced as the slide element moves along the longitudinal length of the rearward extending arm. In some embodiments the cam-roller is adjustable to allow tuning of the wind deflector assembly for optimal angle reducing forces and motor strain. The multiple arm assembly provided herein provides efficient packaging in the confines of the roof opening framework and/or sunroof module.

One approach provides a pretensioning element having an extension spring to pretension the wind deflector support arm in a longitudinal direction. This provides a smoother, more consistent, more durable tension force as the slide track car and movable panel are in motion. The use of an extension spring allows greater design flexibility and load adjustment than known using a torsion spring. Further, the extension spring can pivot with the support arm assembly to provide a consistent pretensioning load along the longitudinal axis of the main rearward extending arm. The present embodiments can provide flexibility to adjust the pivot points for spring force reduction as the wind deflector guide is knocked down. Also, the combination of the profile of the reward deflector arm and the pivot point position does not induce additional loads on a drive motor in the deployed position allowing smooth quiet and consistent operation. This is because as the wind deflector is deployed, the extension spring shortens and thereby provides less tension on the assembly. In another approach, the profile of the reward extending arm profile is specifically configured so that the top edge of the wind deflector profile is at least about 8 mm from the movable cover at all times along the range of positions of the roller cam along the length of the arm. In other words, the top edge of the wind deflector profile is always at least about 8 mm from the movable surface when the roof opening is open, closed, and all points in-between.

Turning now to the figures, there are shown two approaches to the wind deflector assemblies of the present invention, which is generally indicated at 20. Specifically, the embodiments show alternate approaches to the housing the pretensioning element in the deflector arm, the so called deflector arm with top profile 28 (first arm). As noted above, the pretensioning element in this approach provides a rearward force on the deflector arm assembly, but other positions of the pretensioning element are possible within the scope of the present embodiments. It is also noted that many other possible profiles of the first arm could be provided to address additional design requirements for deflector guide height and rake at various points along the travel of the movable surface.

Generally, as shown in the figures, an opening 84 is provided in a roof 82 of a motor vehicle. Opening 84 can be closed by a rigid movable surface 21, such as a sunroof or a moonroof (sunroof 21, FIGS. 9 and 11). Roof opening 84, on its edges, can be surrounded by a roof frame 37 to provide support and attachment to a sunroof module and/or to reinforce the vehicle roof around the opening. Roof frame and/or a sunroof module can have lateral track rails 39 extending in the longitudinal direction of the vehicle. Sunroof 21 movement is guided in rails 39, via a movable sliding track car 78. Disposed within roof frame 37, a wind deflector assembly, designated generally by reference numeral 20, is positioned beneath sunroof 21 so that it can be deployed about an axis extending transversely to the longitudinal axis of the vehicle as sunroof 21 opens. Again, for ease of understanding, the left hand support assembly (not shown) is reciprocal to the illustrated right hand support arm assembly.

Deployment of wind deflector assembly 20 occurs about a pair of pivotally mounted deflector arms 28 permanently attached to each side of the wind deflector guide support 22 and the roof opening frame 37. Again, only one support arm assembly is shown, since the assemblies are symmetrical, run parallel to one another and are arranged on each side of the roof opening 84.

Figure 10:
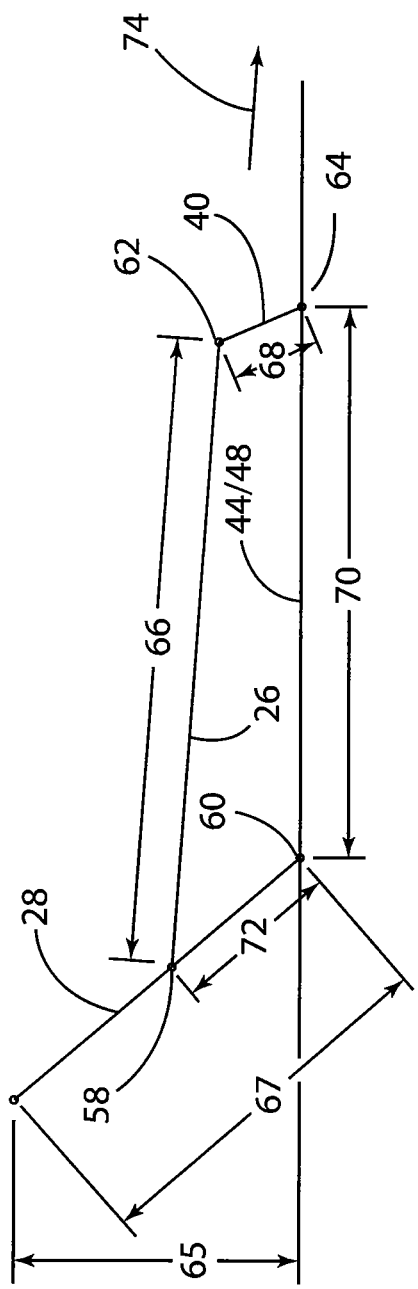
FIG. 10 illustrates a longitudinal schematic side view of the pivot arms for the wind deflector assembly of FIG. 9.
Figure 12:
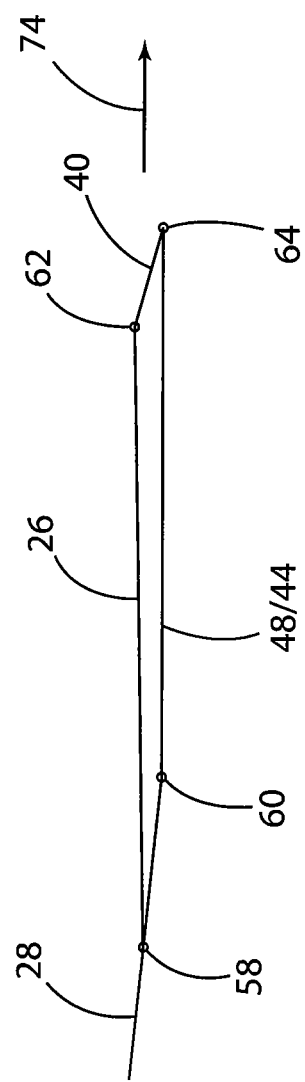
FIG. 12 illustrates a longitudinal schematic side view of the pivot arms for the wind deflector assembly of FIG. 11.

As illustrated, the support arms for the wind deflector assembly 20 can be formed as a 'four-bar' support arm assembly, which can include support deflector arm 26 (bar 1) and support arm 28 (bar 2). Bar 3 can include a pivotally mounted reward deflector arm 40. Bar 4 represents the fixed roof frame 37, which is shown as a forward roof frame mount 48 and rearward roof frame mount 44. The orientation of these four bars about their pivot points is schematically represented in FIG. 10 (deployed) and FIG. 12 (retracted/knocked-down).

Figure 8:
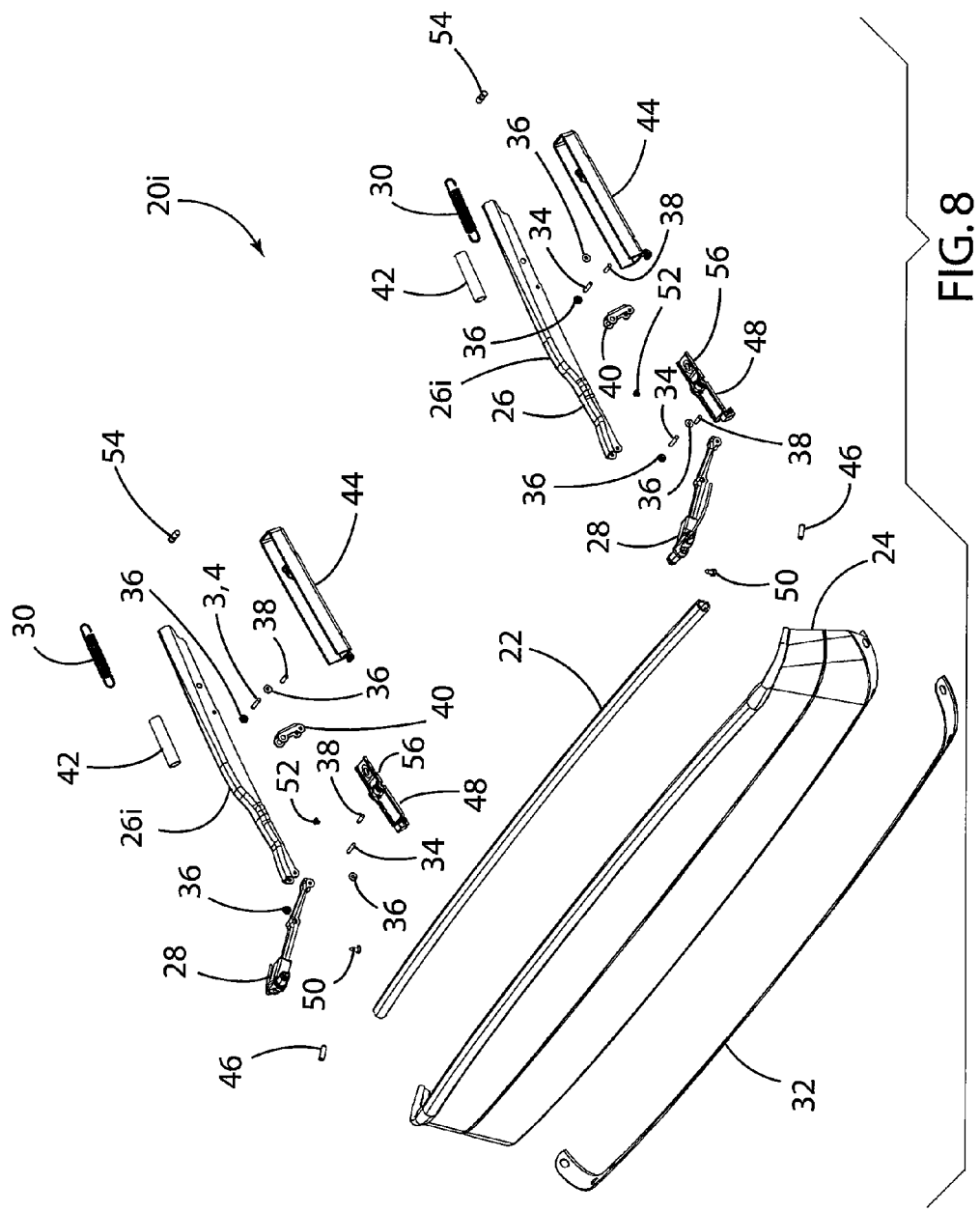
FIG. 8 illustrates a top perspective exploded view of one approach for a wind deflector assembly of the present embodiments.

The components of one approach for a wind deflector assembly of the present embodiments are illustrated in an exploded view in FIG. 8, and includes: a 22 wind deflector guide support; a wind deflector guide (fabric) 24; a tensioned deflector arm with profile 26 (first arm)-26i (FIGS. 8-12); a forward deflector arm (second arm) 28; a tensioning means 30 (such as an extension spring); a fabric retaining strip 32; knurl solid pins 34; shoulder bushings 36; second knurl solid pins 38; a rearward deflector arm 40 (third arm); spring sleeves 42; rearward roof frame mounts (fourth arm) 44; cap wire 46; forward roof frame mounts 48 (fourth arm); mounts 44 and 48 being mounted to the roof by, for example bolts 27 having compression limiters 56 fasteners; (screws) 50; bumper couplers 52; and slotted knurled solid pins 54.

Figure 13:
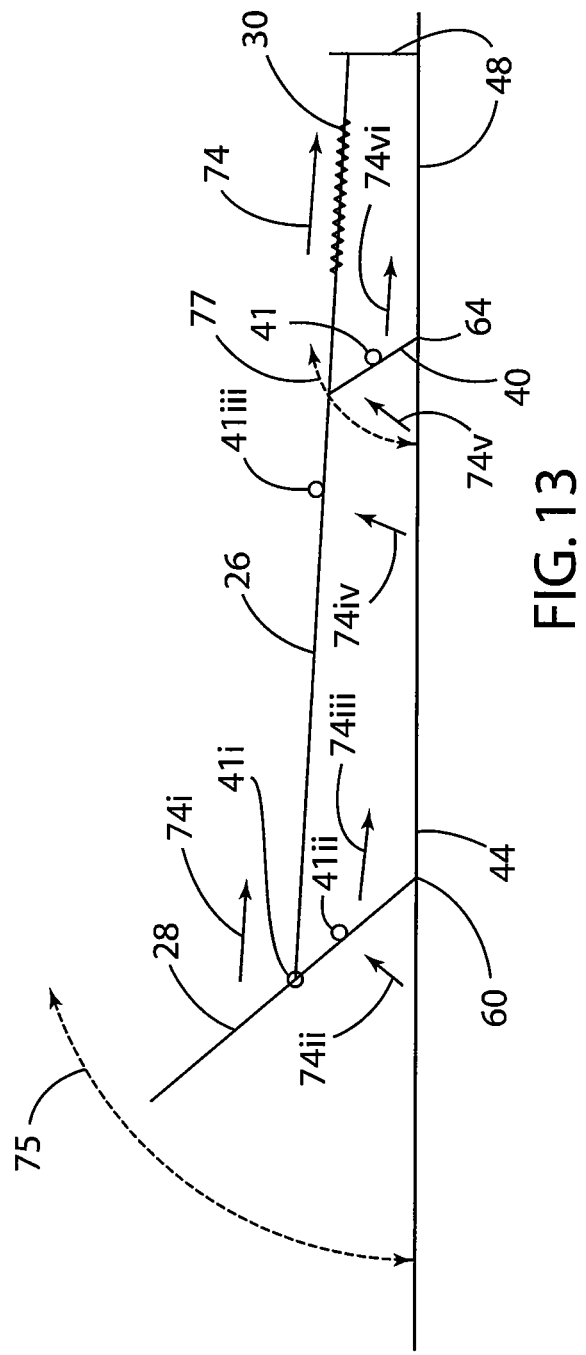
FIG. 13 illustrates a longitudinal schematic side view of the pivot arms for the wind deflector assembly of FIG. 11 showing exemplary positions of pretensioning force and stops.

FIGS. 9-12 illustrate the cooperation of the four bars in one approach (and most clearly in FIGS. 9 and 10) by a front-upper pivot 58; a front-lower pivot 60; a rear-upper pivot 62; and a rear-lower pivot 64. Further, the dimensions of the four bars between pivots are also considered in the positioning of deployment of the wind deflector guide 24 as the sun roof moves along is slide track. These dimensions are illustrated as: dimension 66 between pivot 58 and 62; dimension 68 between pivot 62 and 64; dimension 70 between pivot 60 and 64; dimension 72 between pivot 58 and 60; and the dimension 67 of distance between pivot point 60 and the end of the forward deflector arm attached to the wind deflector guide 24. As shown in FIG. 13, pivot point 60 moves the forward deflector arm 28 along an arc 75 to raise wind deflector guide 24 to a desired height 65 (See FIG. 10). The forward position of arc 75 allows for much improved rake capabilities than known in the art. Also, as shown in FIG. 13, pivot point 64 moves rearward deflector arm 40 along an arc 77.

Various considerations are involved in the determination of the dimensions of the arms and positioning of the pivot points. For example, the wind deflector assembly can be part of an overall sunroof assembly module package restraints for positioning the arm assembly are often limited. Further, the desired height of the wind deflector guide (dimension 65 in FIG. 10) can also be a factor. For example, in one approach dimension 65 can be increased by shortening dimension 66 (between pivots 58 and 62), lengthening dimension 70 (between pivots 60 and 64), lengthening dimension 67, and various combinations thereof. It is noted that dimension 66 and 70 can also be about equal in distance.

Other variables to optimize design parameters detailed above include a cooperating tensioning force 74 on tensioned deflector arm 26 (FIGS. 10 and 12) and the profile of tensioned deflector arm 26. In one embodiment: dimension 72 can be in the range of about 40 to 50 mm, and preferably about 45 mm; dimension 66 can be in the range of about 160 to 190 mm, and preferably about 172 mm; dimension 68 can be in the range of about 15 to 30 mm, and preferably about 21 mm; and dimension 70 can be in the range of about 150 to 170 mm, and preferably about 160 mm. Accordingly, pivot points 62 and 64 are about 12 percent of the distance between pivot points 62 and 58. Pivot points 58 and 60 are about a range of 20 to 30 percent (preferably 26 percent) of the distance between pivot points 62 and 58. And, pivot points 60 and 64 are about a range of 75 to 95 percent (preferably about 90 percent) of the distance between pivot points 62 and 58.

Accordingly, in one embodiment the distance 67 between pivot point 60 and the first end of the second deflector arm 28 can be in the range of about 100 to 130 mm, and preferably about 115 mm. Accordingly, second deflector arm first end and pivot point 60 can be in the range of about 50 to 75 percent (preferably about 67 percent) of the distance between pivot points 58 and 62.

Figure 1:
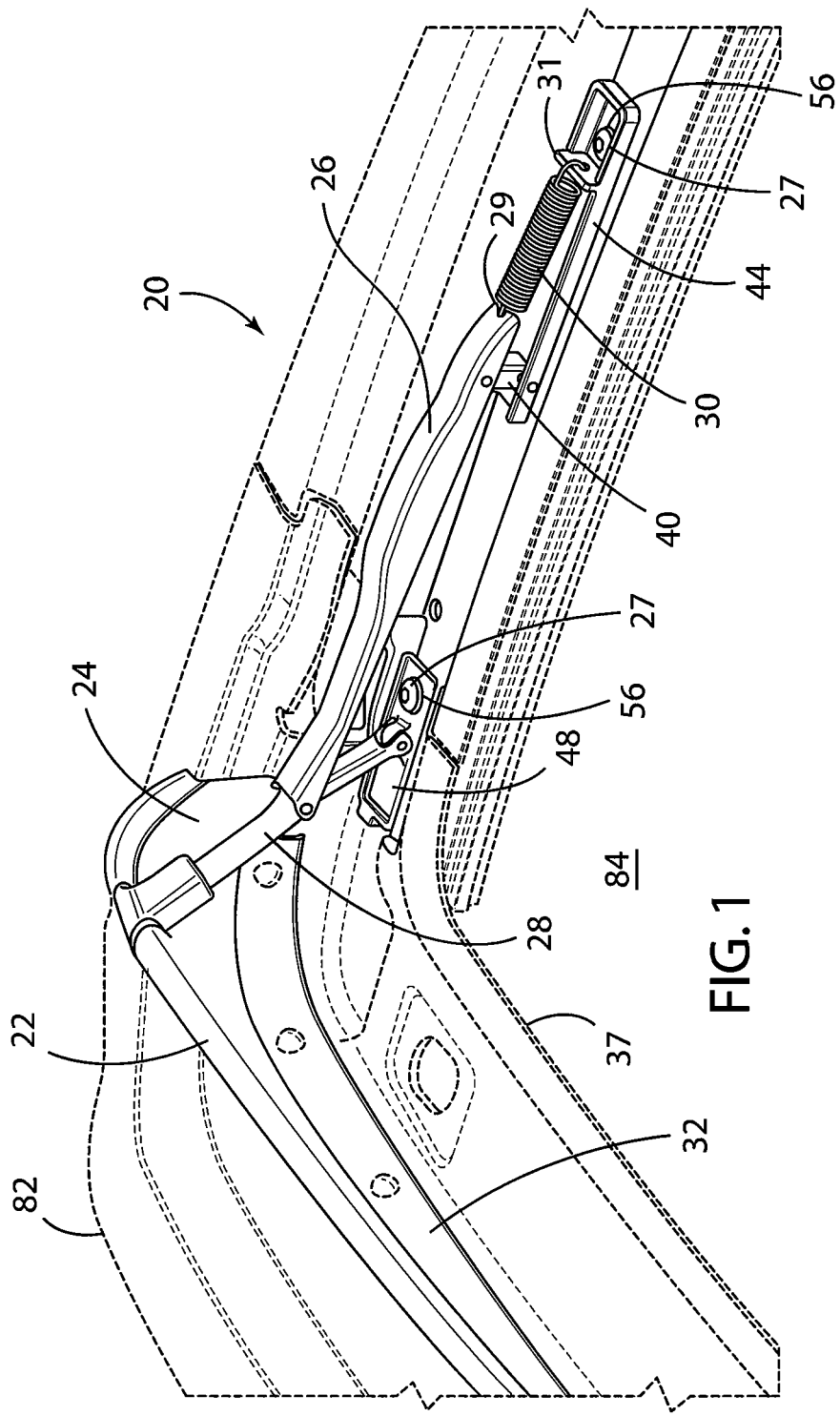
FIG. 1 illustrates a top perspective view of one approach for a wind deflector assembly of the present embodiments in a deployed position.
Figure 2:
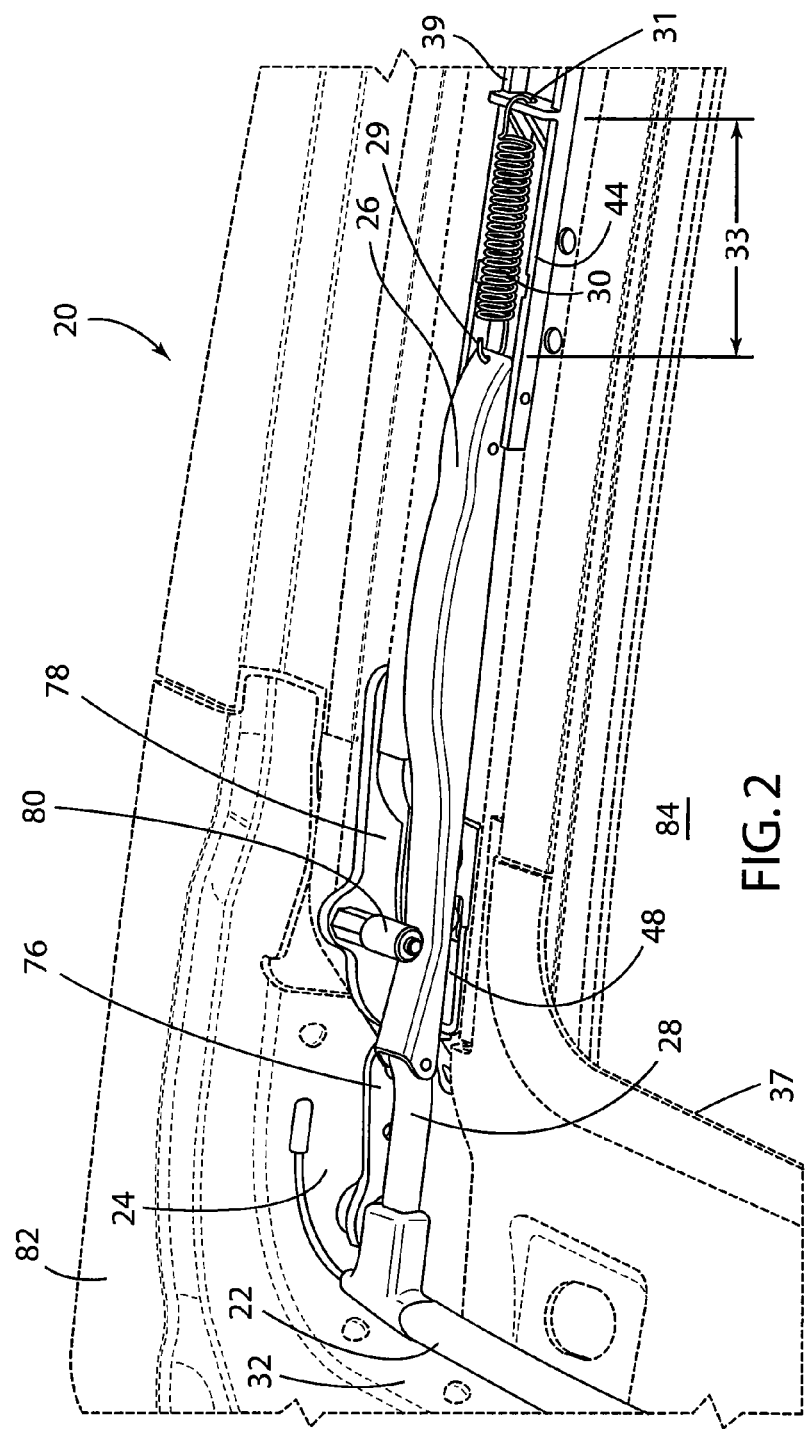
FIG. 2 illustrates a top perspective view of one approach for a wind deflector assembly of the present embodiments in a retracted position with the wind deflector profile removed.
Figure 3:
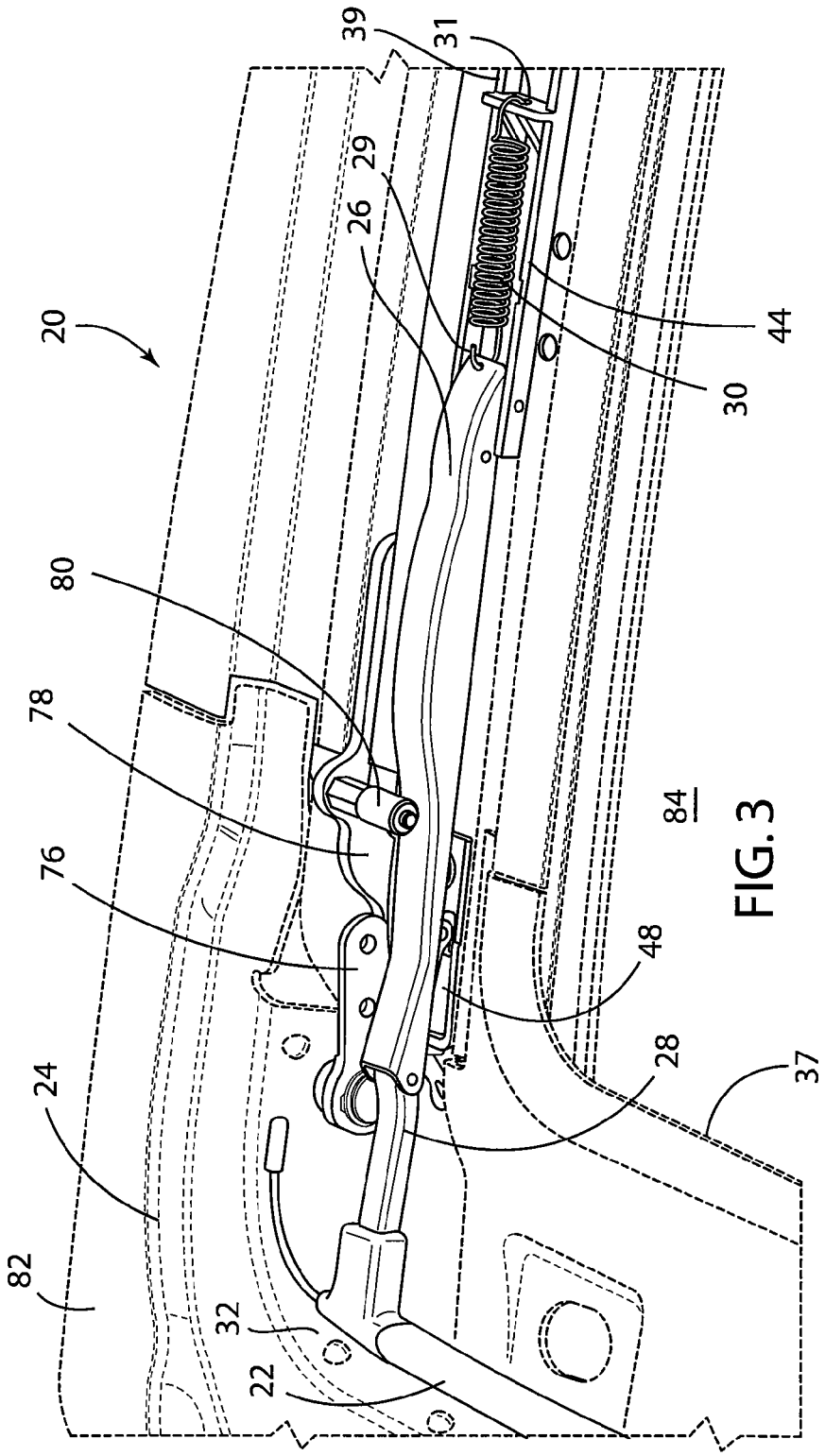
FIGS. 3-7 illustrate top perspective views of one approach for a wind deflector assembly of the present embodiments in successive operative positions of deployment.
Figure 4:
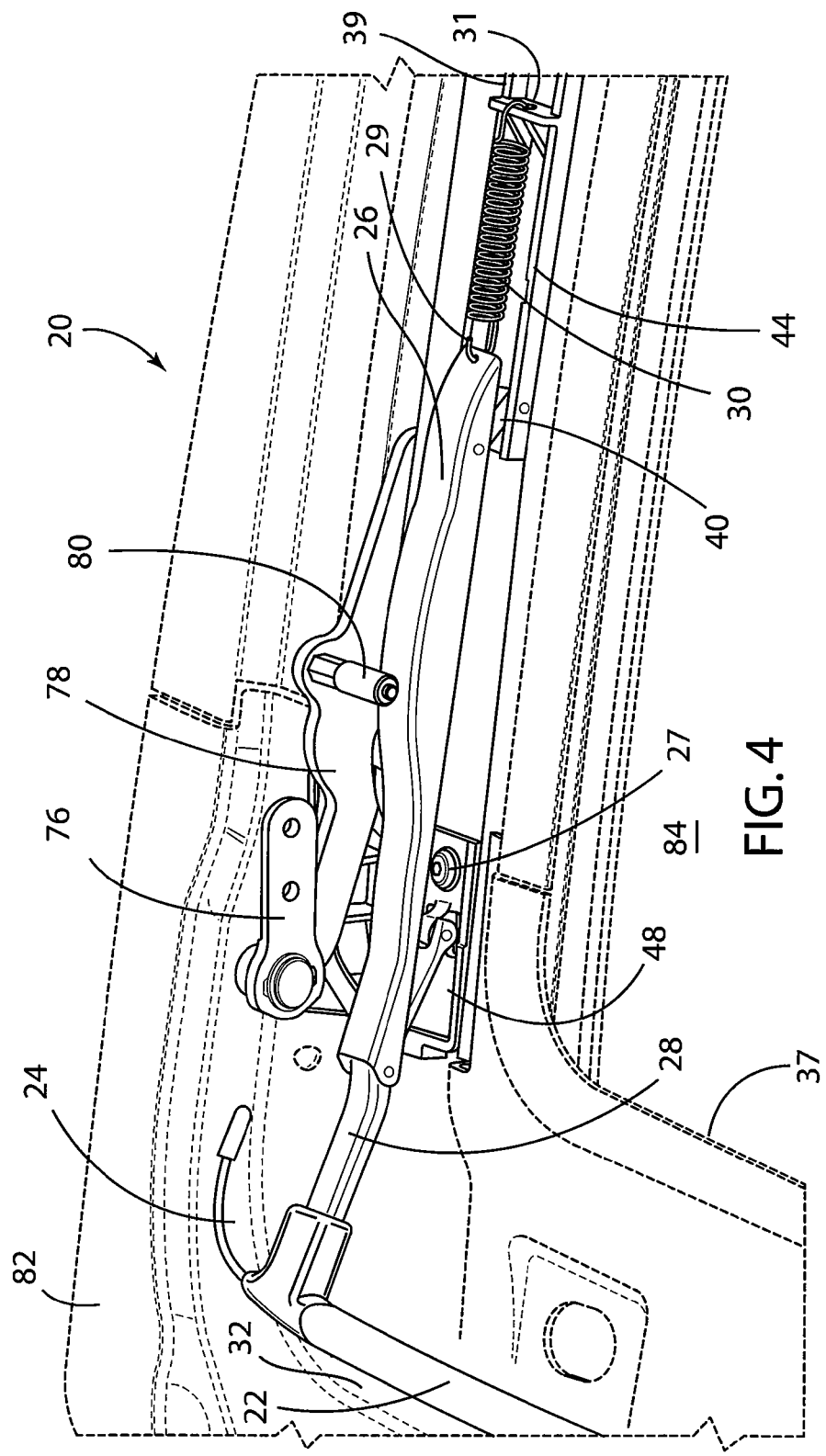
Figure 5:
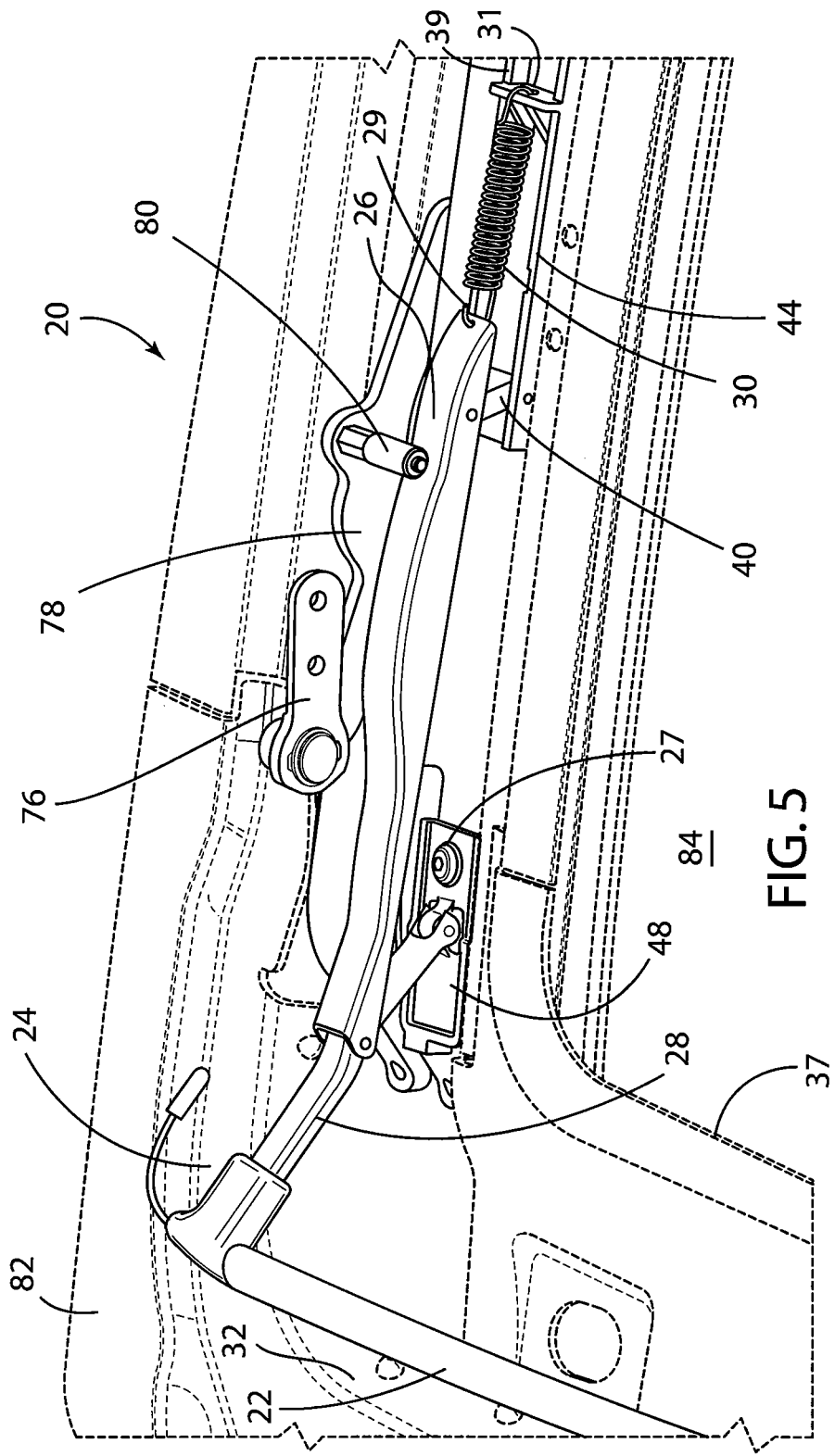
Figure 6:
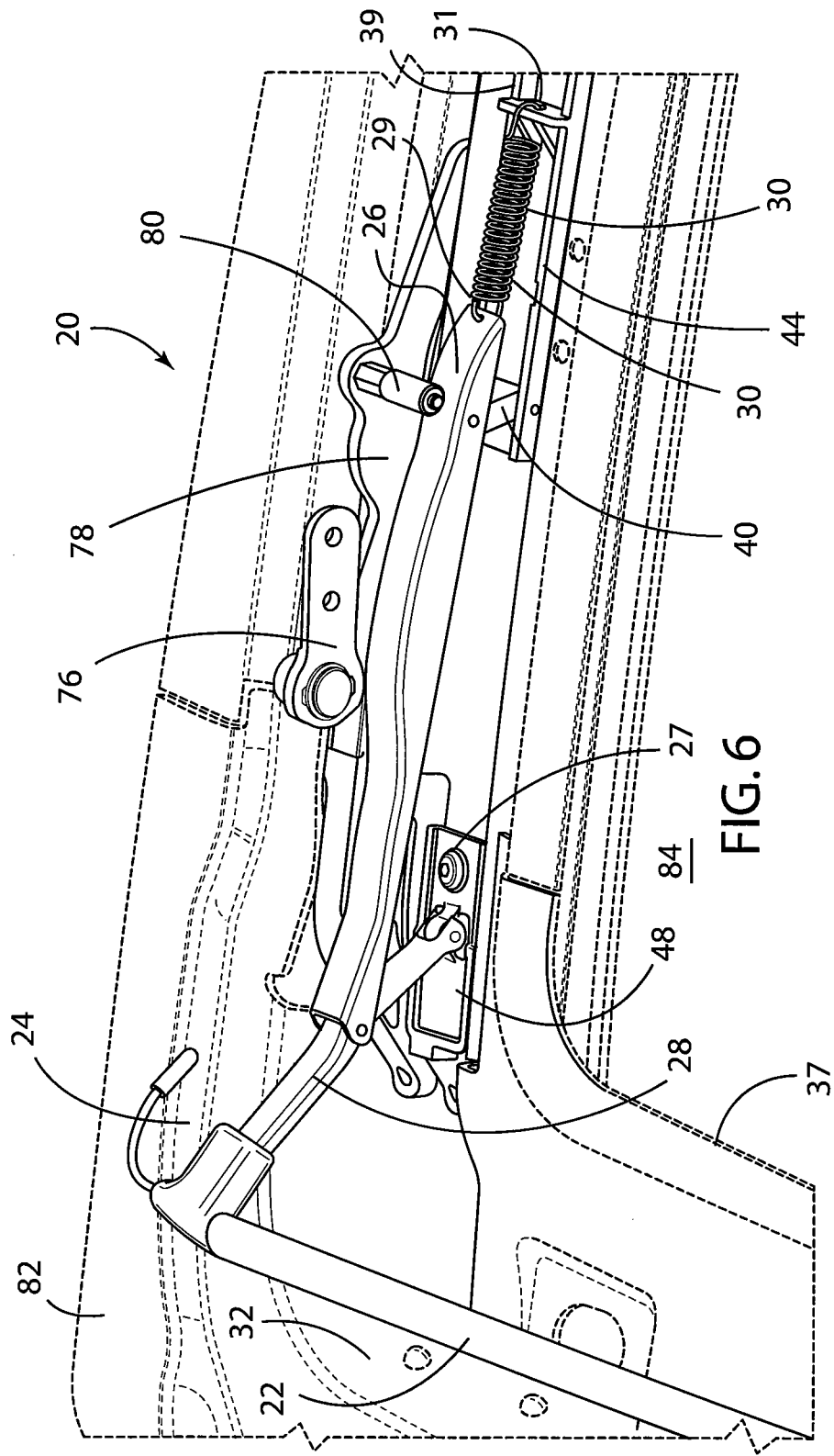
Figure 7:
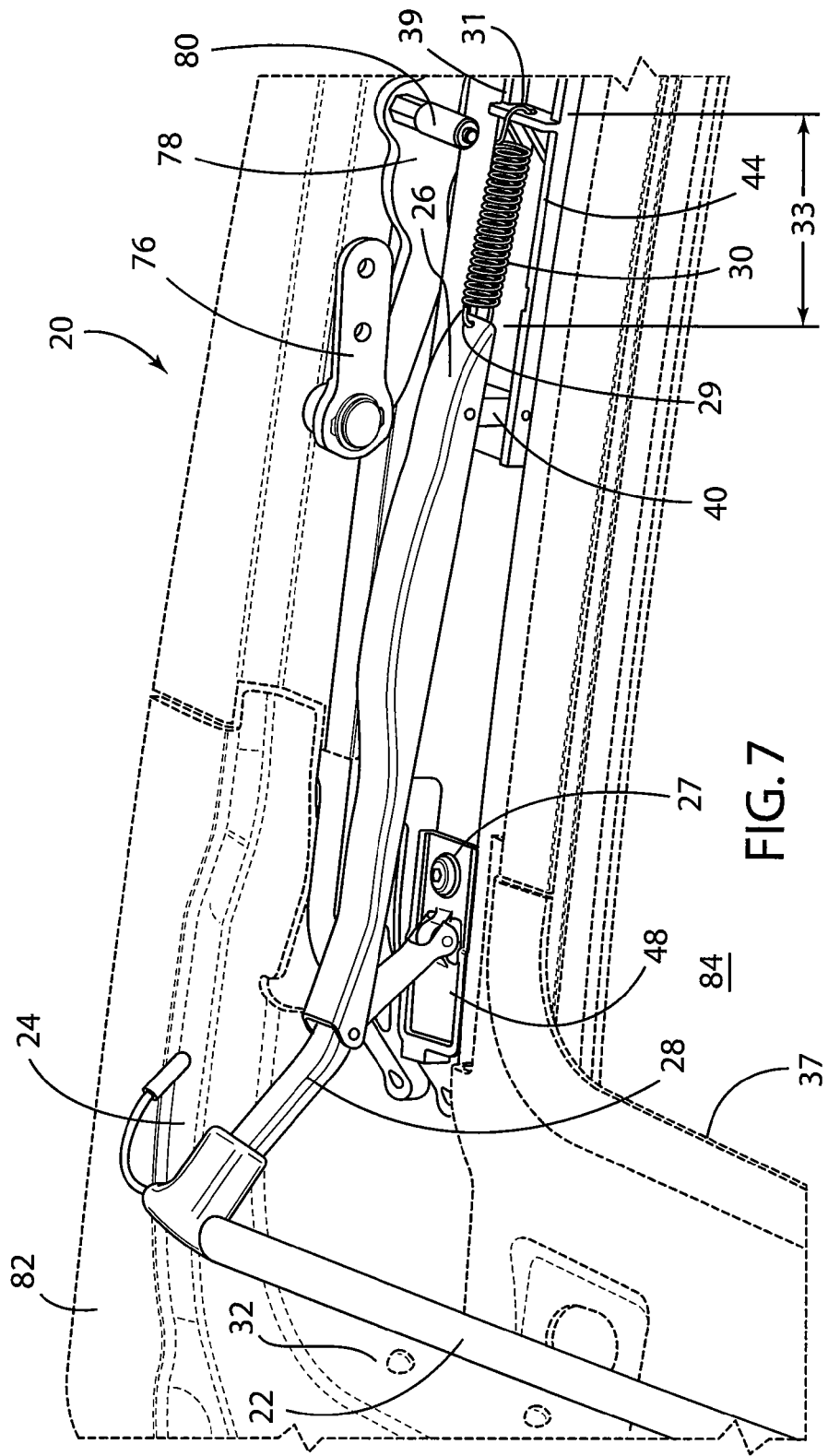
Figure 9:
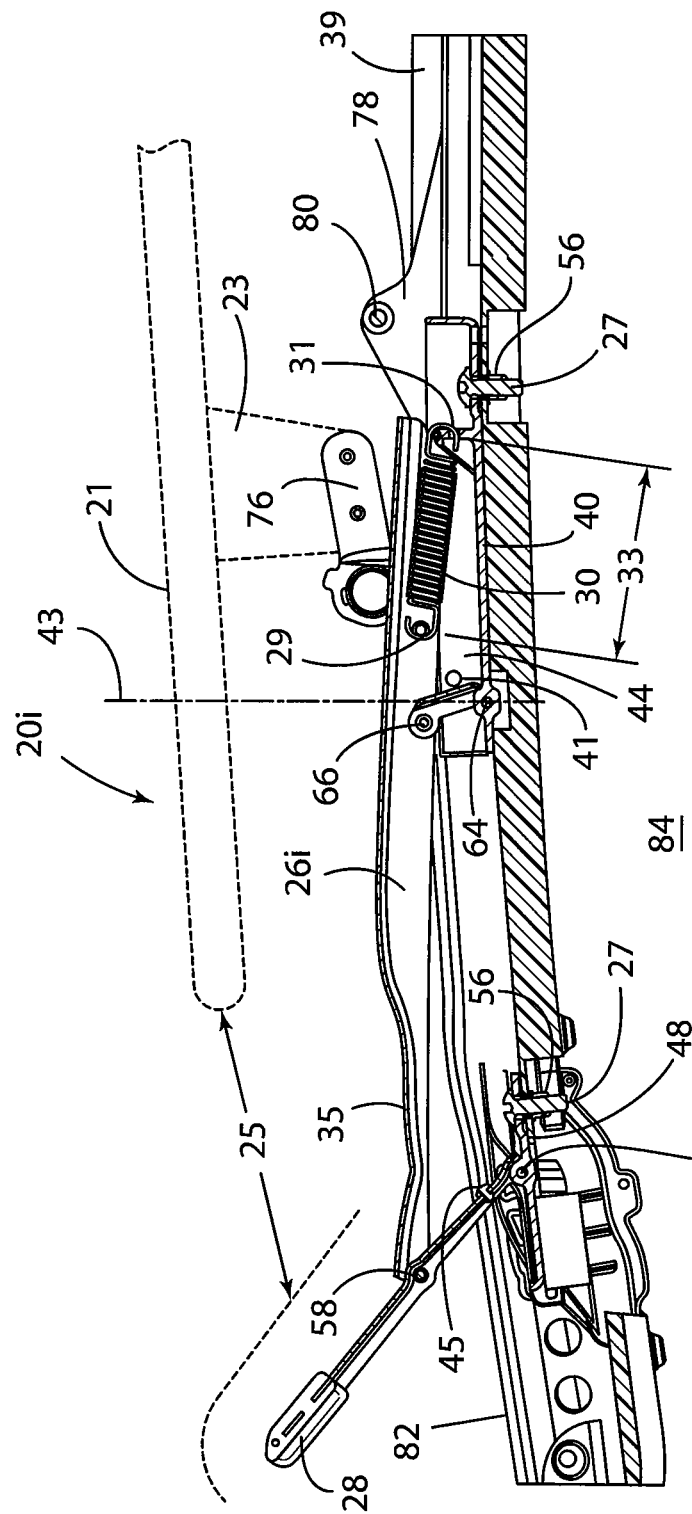
FIG. 9 illustrates a longitudinal side view of another approach for a wind deflector assembly of the present embodiments in a deployed position with the wind deflector profile removed.
Figure 11:
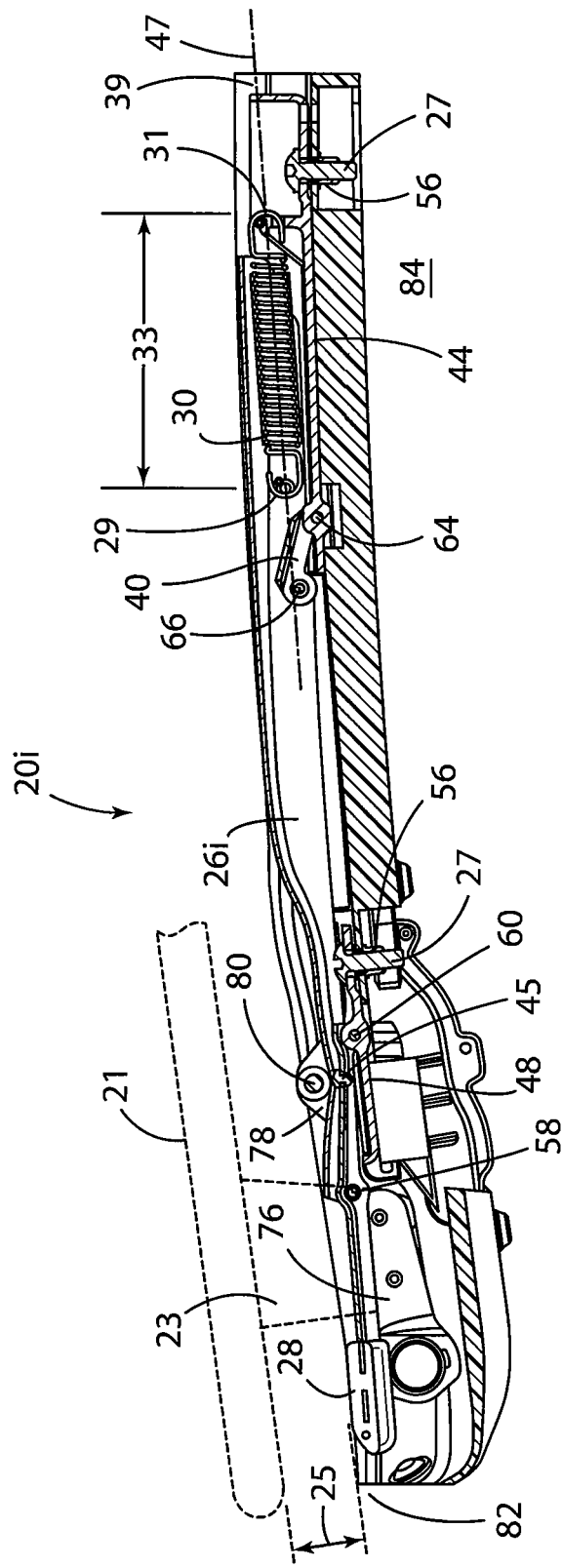
FIG. 11 illustrates a longitudinal side view of another approach for a wind deflector assembly of the present embodiments in a retracted position with the wind deflector profile removed.

Tensioning force 74 can result from the use of, for example, an extension spring 30 attached to deflector arm 26 at point 29 and to the roof from attachment point 31. It is noted that deflector arm 26i, shown in FIGS. 9 and 11 show an extended housing so that spring 30 is disposed with the housing of deflector arm 26i. The present embodiments also provide for adjustment and calculation of the spring connection distance 33 (FIGS. 2 and 7). This distance and the tension provided by spring 30 allow for optimal adjustment of the desired tension factored against the tension of the spring. Tensioning element 30 positioning is preferably configured to have provide reduced variation of tensioning force as the deflector arm assembly moves through its cycle from deployed to retracted. Preferably, this force would specifically not increase significantly as the assembly is retracted.

In one approach, tension force can be in the calculated as it relates to the desired force at a centerline of the deflector guide in its deployed and retracted position. The desired force of the centerline of the deflector guide can be considered as the force applied on deflector arm 28 to rotate along its arc 75 (see FIG. 13). In the present embodiments this force would be divided among the number of tensioning means. The present embodiments are preferably pairs of reciprocal left/right assemblies place on either side of the wind deflector guide, though not required. Accordingly, the amount of tension could be equally split on each side. It is noted though that in one approach a single centerline assembly can be configured.

In one specific left-hand/right-hand assembly embodiment, a first deflector guide centerline force (e.g, equidistant from the dual assemblied along a transverse edge of the wind deflector profile guise) in a deployed (up) position can be in the range of about 22 to about 30 (Newton meter) Nm. In a retracted (down) position, the deflector guide centerline force can be in the range of about 12 to about 20 Nm. More generally, the force on forward deflector arm 28 is reduced as it swings about pivot axis 60 to a retracted position. This allows for easier retraction of the wind deflector guide in the end of its travel to a retracted position, thus reducing strain on the force used to overcome the tensioning means (e.g., the motor used to slide a sunroof mechanism and cam).

A second tension force can be calculated as the force of the tensioning element needed to affect the desired force at the centerline of the deflector guide in its deployed and retracted position. Many factors can be considered to determine the force of the tensioning element. These can include the arm lengths, pivot point positions, and tensioning means position. The tensioning element to generate a pre-tensioning force to deploy the wind deflector guide could be positioned on the mechanism more or less at nearly every position of every arm. For example, FIG. 13 shows a few exemplary positions of tensioning and shown as 74, and 74*i*-74*vi*. In one approach where the pre-tensioning element (e.g., an extension spring) is placed to apply a force 74 on the tensioned deflector arm 26, the force can be in the range of about 24 to about 37 Nm (and preferably about 31 Nm) in the deployed (up) position and in the range of about 47 to about 61 Nm in a retracted (down) position. These forces are necessarily higher than the force applied at the wind deflector guide centerline based on the mechanics of the arm assembly to be raised upward and rearward to deploy the wind deflector guide.

In another approach, spring 30 distance can be adjustable. For illustrated purposes only, in one approach a spring 30 can be about 50 mm and extended to a deployed (pre-load) dimension 33 of about 65 mm when installed between connection points 29 and 31 (FIG. 9). As the assembly is retracted, spring 30 can be extended (loaded) to a dimension 33 of about 76 mm. Accordingly, prior to installment the extension spring provides no tension, but when extended about 30 percent at its deployed position provides of tension and extended 50 percent at its retracted position provides about of tension. One design consideration in addition to its force is the amount of fatigue of the spring as it cycles during the lifetime of the product.

Although tensioning means 30 is positioned along the axis of deflector arm 26*i*, it is noted that tensioning force 74 can be provided at many positions of the deflector arm assembly and be within the scope of the present embodiments. For example, various alternate tensioning means can be positioned as shown in FIG. 13 at positions 74*i*-74*vi*. As shown, embodiments 74*ii* and 74*iv* could provide a compression spring. The other embodiments could use extension springs. The present embodiments could also provide for one or more tensioning means 30.

Further, the profile 35 of deflector arm 26 provides pivoting of the arm as a result of cam 80 traveling along its surface as track car 78 slides to displace the sunroof. It is noted that cam 80 is preferably a roller cam, but in other approaches a slider can be used. As shown in FIGS. 9 and 11 track car 78 has a sunroof bracket 76, which attaches to a sunroof 21 having a sunroof mount 21. FIGS. 9 and 11 also show a dimension 25, which represent the clearance distance of the wind deflector guide to the sunroof. In some approaches this dimension is at least 6 mm, and preferably at least 8 mm. FIGS. 2 through 7 show the affect of the position of deflector arm 26 at various roller cam 80 positions points along its travel as a result of profile 35. Profile 35 can be configured to mimic the profile of the cam profile for positioning the sunroof (not shown). In other approaches, profile 35 can be a straight line (linear) such as shown in arm 104 in Prior Art FIG. 14. Specifically, profile 35 should maintain a consistent and predetermined distance from the sunroof to the wind deflector guide and the body of the vehicle.

As shown in the start of the roof opening sequence, the profile maintains deflector arm in a static position for the first approximately 10 percent of the sequence. This allows for the sunroof to retract sufficiently to allow for clearance of the deflector guide when it deploys. Next, along the travel of the roller cam, the tensioned deflector arm is allow to raise to almost full deployment within the first 50 percent of deployment. The remaining profile is to maintain a stationary wind deflector guide position despite curves in the vehicle roof line or desired change of positioning the sunroof.

Design parameters for the present embodiments include the use of non-sliding elements in the wind deflector mechanism. Rearward deflector arm 40 provides benefit by instead providing two bushed pivot points 66 and 64. As a further benefit, as deflector arm travels on its arc, it moves deflector arm 26/26*i* rearward, thus reducing the tensioning of the assembly as the sunroof moves rearward. By adding the forward deflector arm, a cantilever affect is established and becomes more pronounced as distance 72 is reduced. This allows the profiled deflector arm to be disposed lower in the assembly than known in the art, thus reducing the potential for side wind noise and providing a more attractive package. Further, by moving the pivot point 60 forward and extending deflector arm 28 beyond pivot point 58, a greater deflector height and rake can be achieved. The improved rake possibilities can allow for a more aerodynamic configuration, though it is noted that deployed over-centering of deflector arms 28 and 40 is preferably avoided. In this instance, deployed over-centering means that deflector arms would pivot past top center and orient rearward of its vertical axis (shown as axis 43 in FIG. 9). In some embodiments, a hard stop could be added, such as behind deflector arm 40 to prevent this from happening, even if the deflector guide were to separate from the vehicle. In one approach, a stop 41 can be positioned rearward of deflector arm 40. In other approaches shown in FIG. 13, the stop can be positioned, as shown, at 41*i*, 41*ii* and 41*iii*. Further a retracted over-centering should also be avoided. In this instance, retracted over-centering means that connection point 29 of tensioning means 30 does not fall below the linear axis 47 between pivot point 66 and tensioning means connection point 31 (See FIG. 11). Restricting retracted over-centering can be accomplished by adding a stop at various positions along the deflector arm assembly. For example, FIGS. 9 and 11 show a bumper stop 45 positioned to stop retraction and retracted over-centering of the deflector arm assembly. In some embodiments, bumper 45 can be made from a pliable material, such as rubber, to prevent rattling of the assembly in the retracted position.

While the figures and descriptions herein have been described in conjunction with specific embodiments, many alternatives, modifications, and variations will be apparent to those skilled in the art in light of the foregoing description. Changes in form, as well as substitution of equivalents, are contemplated as circumstances may suggest or render expedient.

The invention claimed is:

1. A wind deflector assembly for a vehicle having a roof opening, comprising:
   a wind deflector guide attached to a vehicle along a front edge of the roof opening in a generally transverse axis of the vehicle on its lower edge;
   the wind deflector guide extendible above the roof opening by attachment on its upper edge to two reciprocal assemblies of three deflector arms each movable on four pivot mounts mounted to and extending rearward along a generally longitudinal axis of the vehicle;
   the two reciprocal assemblies having a pretensioning element to extend the wind deflector guide from a retracted position to a deployed position,
   wherein a first deflector arm is pivotally connected at a first end to a second forward deflector arm along its length and is pivotally connected along its length to a first end of a third rearward deflector arm; and
   the wind deflector guide is connected at its upper edge to a first end of the second forward deflector arm; and the second and third deflector arms pivotally mounted to the vehicle at each respective second ends.

2. The wind deflector assembly of claim 1, wherein the first deflector arm has a top edge profile that operates to work in cooperation with a cam on a sliding track car for a movable surface to maintain the extension of the top edge of the wind deflector guide along the travel of the slide track car at a predetermined distance from the movable surface.

3. The wind deflector assembly of claim 2, wherein the predetermined distance is at least about 8 mm.

4. The wind deflector assembly of claim 1, further comprising at least one stop to prevent the second and third deflector arms from pivoting more than 90 degrees.

5. The wind deflector assembly of claim 1, wherein the pretensioning element is positioned on the first deflector arm in a generally rearward longitudinal axis of the vehicle.

6. The wind deflector assembly of claim 5, wherein the pretensioning element is an extension spring.

7. The wind deflector assembly of claim 5, wherein the pretensioning element is disposed within the first deflector arm.

8. The wind deflector assembly of claim 6, wherein the extension spring is mounted to the vehicle to be extended about 30 percent greater than its preload length in the deployed position and to be extended about 50 percent greater than its preload length in the extended position.

9. The wind deflector of claim 1, wherein the pretensioning element has a reduced force on the wind deflector guide in the retracted position relative to the deployed position that is in the range of about 9 percent to about 60 percent.

10. The wind deflector of claim 9, wherein the force on the wind deflector guide is in the range of about 22 to about 30 in the deployed position and in the range of about 12 to about 20 Nm in the retracted position.

11. The wind deflector of claim 5, wherein the pretensioning element provides a force on the first deflector arm that is greater than the force transferred to the wind deflector guide in the ratio range of about 1:1.09 to 1:1.69 times in the deployed position; and in the ratio range of about 1:2.35 to about 1:5.09 in the retracted position.

12. An assembly configured to deploy a wind deflector of a vehicle having a roof opening, comprising:
    two reciprocal assemblies of three deflector arms movable on four pivot mounts mounted to and extending rearward along a generally longitudinal axis of the vehicle;
    the two reciprocal assemblies having a pretensioning element to extend from a retracted position to a deployed position;
    wherein a first deflector arm is pivotally connected at a first end to a second forward deflector arm along its length and is pivotally connected at its second end to a first end of a third rearward deflector arm; and
    a connection point at a first end of the second forward deflector arm; and the second and third deflector arms pivotally mounted to the vehicle at each respective second ends.

* * * * *